Jan. 3, 1967     K. B. NORLIN ETAL     3,295,581
NUT LOCKING DEVICE
Filed Dec. 2, 1964
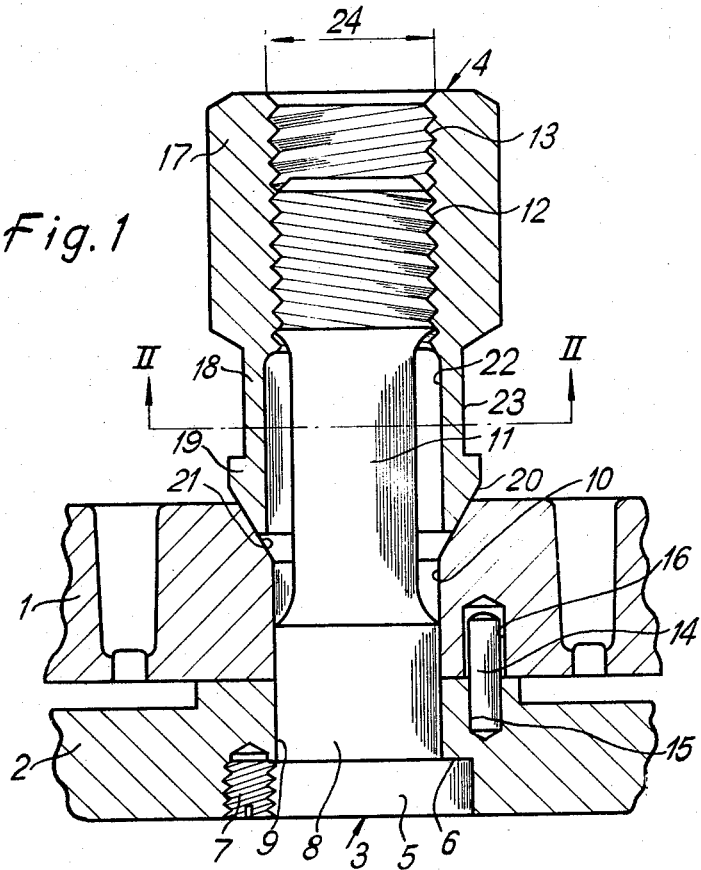
INVENTORS
KNUT BERTIL NORLIN &
ERIK ROLAND LUNDBERG
BY
ATTORNEY

3,295,581
NUT LOCKING DEVICE
Knut Bertil Norlin and Erik Roland Lundberg, Nacka, Sweden, assignors to Atlas Copco Aktiebolag, Nacka, Sweden, a corporation of Sweden
Filed Dec. 2, 1964, Ser. No. 418,580
6 Claims. (Cl. 151—38)

This is a continuation-in-part of application Serial No. 199,530, filed June 1, 1962, and now abandoned.

This invention relates generally to a nut locking device for securing two members together. More particularly, it relates to such a device in which complete uniform friction is achieved between the cooperating surfaces of the nut and the member against which it is secured, thereby bringing about absolute locking of the two members together and, further, this achievement is made without permanently deforming any portion of the device. Because of this, no tearing or rending is necessary to remove the nut in the event that such a removal is called for, and the device is available for further use.

In conventional apparatus of this nature, a bolt is used to cooperate with the nut, the bolt extending from one side of the two members being secured with the nut being positioned on the opposite side. It has been found that in high speed, high pressure machinery (such as compressors), the vibration created by the operation of such machinery causes loosening of such a nut and bolt connection. Therefore, many attempts have been made to overcome this problem.

One such is the use of a tapered surface between the cooperating surfaces of the nut and the member it is bearing against. This is usually achieved with tapered surfaces in the held member being recessed into the member around the hole through which the bolt passes. A further development along this line provides for a nut with a throat section which surrounds the cooperating end of the bolt. When the parts are secured together, that throat portion is permanently deformed, with the deformed portion being bent toward the bolt and pressed into its surface. This achieves a firm connection in locking the parts together, but it sacrifices the nut locking device itself, by permanent deformation thereof, if removal becomes necessary for repairs or replacement. Further, it makes removal difficult when the bent or mangled parts are being taken apart.

It is one object of this invention, therefore, to provide a nut locking device in which the nut and bolt are positioned as desired and in self locking arrangement for holding two members together with no loosening of the parts by assuring completely uniform and even distribution of friction over the entire abutting surfaces of the nut and a member being held and without permanent deformation of the nut locking device. Further, the nut and bolt are kept in this predetermined position for holding two members together, and still may be loosened without damage to the nut or bolt or the members held together. Another object of this invention is to provide a nut locking device in which cotter pins, locking wire, lock screws or similar supplementary means may be dispensed with for maintaining the nut in a predetermined position. A still further object of the invention is to provide a nut locking device in which considerable torque is necessary for loosening the nut, and in which a greater frictional force is obtained without permanent deformation thereof.

A still further object of the invention is to provide a nut locking device which requires no extra space as compared with known bolts and nuts, and which may be assembled and taken apart with conventional tools. Another object of the invention is to provide simple means for securing and carrying an inlet valve arrester for compressor section valves.

With the foregoing and other objects in view, this invention will be explained in more detail, and other objects and advantages thereof will be apparent from the following description, the accompanying drawings, and the appended claims.

In the drawings:

FIG. 1 is a vertical axial section through a nut locking device, and

FIG. 2 is a section along line II—II of FIG. 1.

In the drawings, 1 designates a fragmentary portion of a valve seat of a compressor, and 2 a portion of a valve guard which is held together with the valve seat by means of a bolt 3 and a nut 4. The bolt 3 has a head 5, which is seated in a wider bore 6 in the valve guard 2, and which is locked against rotation in the valve guard by a lock screw 7. The bolt 3 has a shank 8, which fits in a bore 9 in the valve guard 2, and a corresponding bore 10 in the valve seat 1. The bolt carries, also, a reduced bolt portion 11 which carries a screw-threaded portion 12 meshing with internal screw threads 13 in the nut 4. A pin 14 pressed into a bore 15 in the valve guard 2 and fitting a bore 16 in the valve seat 1 prevents rotation of the valve seat with regard to the valve guard.

The nut 4 has a head portion 17 which carries internal screw threads 13 and may be of hexagonal cross section, and which merges into a tubular throat 18. Tubular throat 18 carries a thickened flange portion 19 at one end thereof. At the end of the tubular neck portion of nut 4 is a tapered end surface 20 which fits a tapering surface 21 in the valve seat 1 at the end of the bore 10. The flange 19 and the head 17 of the nut 4 are substantially non-yielding portions axially, whereas the tubular throat 18 has a certain axial yielding capacity.

In their assembled positions, there are opposite counteracting forces directed axially at the tapered surfaces 20—21. That is, there is an axial force through the throat portion 18 which is directed against the tapered surface 21. Further, there is an opposite reaction force against the tapered surface 20. The result of this is an even distribution of forces parallel to the axis of bolt 3 and nut 4 at the tapered surfaces. However, because of the direction of the taper, these counteracting reacting forces form a momentum of force against the flange 19 which tends to bend the flange and the free end of the throat section 18 outwardly away from the reduced portion of the bolt 3. This is achieved because the more resilient portion 18 of the nut has a tendency to bow, because the wider flange portion 19 will not bow. This force moving, or tending to move, the flange 19 outwardly counteracts the radially inwardly directed force resulting from the counteracting tapered surfaces. Obviously, the direction of taper can be reversed and the flange 19 positioned radially on the inner surface of throat 18 on the opposite side of throat 18 from the point of the tapered end surface 20. The oppositely directed radial forces will still counteract each other at the opposing tapered surfaces.

What is achieved, therefore, is an equally balanced uniform pressure over the entire abutting surfaces 20 and 21. This uniform pressure over the entire surface brings about a much larger friction force, and is therefore available for holding the nut in place without requiring deformation, permanent damage or change to the shape of the nut.

In order to achieve this uniform balanced friction force on the abutting surfaces, it is necessary that the throat portion 18 never touches or comes into contact with the reduced portion 11 of the bolt upon their assembly. Therefore, the throat 18 has smooth cylindrical inner and outer surfaces 22 and 23, respectively, the diameter of the surface 22 being slightly larger than the root diameter 24 of the threads of the nut head portion so that a clearance is always maintained between the inner surface 22 and the reduced portion 11 of the bolt 3. The diameter of the external surface 23 is preferably slightly less than the wrench gap diameter of the nut.

In the illustrated embodiment of the invention, the threaded nut head 17 has greater length than the threaded portion 12 of the bolt 3, so that a valve actuating mechanism such as a holding down mechanism for a compressor suction valve or valve assembly or breaking down tools may be secured on the nut head 17.

As is apparent, therefore, there is described herein a unique device which achieves complete frictional locking of two parts together without any deformity of the two parts being locked together or the parts of the device itself. Further, the device can be unscrewed or taken apart without any damage to any of these parts. Even so, a complete secure uniform frictional locking is achieved which requires a substantial torque to break and which withstands the substantial vibrations in heavy duty machinery.

While the structures and apparatus herein described constitute preferred embodiments of the invention, it is to be understood that the invention is not limited to these precise structures and apparatus, and that changes may be made therein without departing from the scope of the invention which is defined in the appended claims.

What is claimed is:

1. In the combination of a reusable nut locking device of the character described and a threaded member which is to be secured to a body from which it projects, said body having a tapered friction surface around said projecting member, a nut having an internally screw-threaded portion at one end thereof for engagement with said threaded member, a tubular cylindrical throat portion axially spaced from said threaded portion and having an external diameter less than the external diameter of said threaded portion and an internal bore with an internal diameter greater than the major diameter of the screw thread of said threaded portion and substantially constant throughout the axial extent of said throat portion for providing clearance between said throat portion and said threaded member upon assembly and for resiliently yielding axially upon tightening of said nut on said threaded member, a continuous annular flange on said throat portion around the end thereof opposite said threaded portion and axially spaced therefrom, said flange having a substantial axial extent which is substantially thicker than said throat portion forming a radially extending shoulder therearound for yielding less resiliently than said throat portion, and said thicker axially extending portion of said flange terminating in an axially tapered end surface opposite said shoulder and spaced from said throat portion for frictional engagement against said tapered friction surface on said body with the extreme point of said tapered end surface being spaced radially from said shoulder.

2. A combination as recited in claim 1 which also includes said threaded member projecting from said body, means for anchoring said threaded member in said body, external screw threads adjacent the end of said threaded member projecting from said body, and a reduced diameter portion on said threaded member and axially between said threads and said body.

3. A combination as recited in claim 2 in which said reduced diameter portion on said threaded member is of substantial axial extent and axially disposed thereon generally in the portion thereof enclosed by said throat portion of said nut locking device.

4. A combination as recited in claim 1 in which said tapered friction surface in said body and around said projecting member is provided in an annular recess in said body.

5. Apparatus as described in claim 1 in which the external screw threads are substantially shorter than the internal screw threads.

6. Apparatus as described in claim 1 in which said annular flange and said shoulder thereon extend radially outwardly from said throat portion with said point of said taper being adjacent the inner surface of said throat portion.

References Cited by the Examiner
UNITED STATES PATENTS

| | | | |
|---|---|---|---|
| 382,920 | 5/1888 | Westinghouse | 151—38 |
| 1,907,522 | 5/1933 | Eaton. | |
| 2,161,740 | 6/1939 | Eksergian | 151—38 |
| 2,693,377 | 11/1954 | Wurzburger | 285—382.7 |
| 3,003,795 | 10/1961 | Lyon | 151—19 |

CARL W. TOMLIN, *Primary Examiner.*

M. PARSONS, Jr., *Assistant Examiner.*